(12) United States Patent
Su et al.

(10) Patent No.: US 7,617,719 B2
(45) Date of Patent: Nov. 17, 2009

(54) METHOD AND APPARATUS FOR OBTAINING MATERIAL PROPERTY INFORMATION OF A HETEROGENEOUS SAMPLE USING HARMONIC RESONANCE IMAGING

(75) Inventors: Chanmin Su, Ventura, CA (US); Craig Prater, Goleta, CA (US); Gregory F. Meyers, Midland, MI (US); Bryant R. LaFreniere, Midland, MI (US)

(73) Assignees: The Dow Chemical Company, Midland, MI (US); Veeco Instruments Inc., Plainview, NY (US)

( * ) Notice: Subject to any disclaimer, the term of this patent is extended or adjusted under 35 U.S.C. 154(b) by 0 days.

(21) Appl. No.: 11/606,695

(22) Filed: Nov. 30, 2006

(65) Prior Publication Data
US 2008/0127722 A1 Jun. 5, 2008

(51) Int. Cl.
*G01B 5/28* (2006.01)
(52) U.S. Cl. ...................................................... 73/105
(58) Field of Classification Search ............... 73/105; 850/1, 38, 63
See application file for complete search history.

(56) References Cited
U.S. PATENT DOCUMENTS

| | | | |
|---|---|---|---|
| 5,266,801 A | 11/1993 | Elings et al. | |
| RE34,489 E | 12/1993 | Hansma et al. | |
| 5,412,980 A | 5/1995 | Elings et al. | |
| 6,006,593 A * | 12/1999 | Yamanaka | 73/105 |
| 6,694,817 B2 * | 2/2004 | Degertekin et al. | 73/661 |
| 6,935,167 B1 * | 8/2005 | Sahin et al. | 73/105 |
| 6,945,099 B1 | 9/2005 | Su et al. | |
| 7,089,787 B2 * | 8/2006 | Sahin et al. | 73/105 |
| 7,115,229 B2 * | 10/2006 | Zenhausern | 422/68.1 |

OTHER PUBLICATIONS

Wang, W. L. and Whitehouse, D. J. "Application of neural networks to the reconstruction of scanning probe microscope images distorted by finite-size tips", Nanotechnology 6 (1995) 45-51.*
Tyulyukovskiy, E. and dHuber, N. "Neural networks for tip correction of spherical indentation curves from bulk metals and thin metal films", J. Mechan Phys Solid. 55 (2007) 391-418.*
Stark, "Spectroscopy of Higher Harmonics in dynamic Atomic Force Microscopy", Nanotechnology 14 (2004) pp. 347-351.

* cited by examiner

*Primary Examiner*—Daniel S Larkin
(74) *Attorney, Agent, or Firm*—Boyle Fredrickson S.C.

(57) ABSTRACT

A method and apparatus for its practice are provided of differentiating at least one component of a heterogeneous sample from other component(s) using harmonic resonance imaging and of obtaining information regarding the sample from the differentiation. In a preferred embodiment, an image is created of a property of a harmonic or a combination of a harmonics producing a response having a contrast factor between the sample's constituent components. The desired harmonic(s) can be identified either in a preliminary data acquisition procedure on the sample or, if the sample's constituent components are known in advance, predetermined. The desired harmonic(s) may be identified directly by the user or automatically through, e.g., pattern recognition. A compositional map may then be generated and displayed and/or additional information about the sample may be obtained.

29 Claims, 7 Drawing Sheets

METHOD AND APPARATUS FOR OBTAINING MATERIAL PROPERTY INFORMATION OF A HETEROGENEOUS SAMPLE USING HARMONIC RESONANCE IMAGING

REFERENCE TO US GOVERNMENT GRANT

This invention was made with United States government support awarded by the following agency: NIST-ATP70NANB4H3055. The United States has certain rights in this invention.

BACKGROUND OF THE INVENTION

1. Field of the Invention

The present invention is directed to probe-based instruments and, more particularly, relates to a method and apparatus for differentiating components of a heterogeneous sample from one another using harmonic resonance imaging and obtaining information about properties of the components from the measurements obtained during the imaging process.

2. Description of Related Art

Several probe-based instruments monitor the interaction between a cantilever-based probe and a sample to obtain information concerning one or more characteristics of the sample. For example, scanning probe microscopes (SPMs) typically characterize the surface of a sample down to atomic dimensions by monitoring the interaction between the sample and a tip on the cantilever probe. By providing relative scanning movement between the tip and the sample, surface characteristic data can be acquired over a particular region of the sample, and a corresponding map of the sample can be generated.

The atomic force microscope (AFM) is a very popular type of SPM. The probe of the typical AFM includes a very small cantilever which is fixed to a support at its base and which has a sharp probe tip attached to the opposite, free end. The probe tip is brought very near to or into contact with a surface of a sample to be examined, and the deflection of the cantilever in response to the probe tip's interaction with the sample is measured with a deflection detector, such as n optical lever system, an example of which is described in Hansma et al. U.S. Pat. No. RE 34,489. The probe is scanned over a surface using a high-resolution three axis scanner acting on the sample support and/or the probe. The instrument is thus capable of creating relative motion between the probe and the sample while measuring the topography, elasticity, or some other surface property of the sample as described, e.g., in Hansma et al. U.S. Pat. No. RE 34,489; Elings et al. U.S. Pat. No. 5,266,801; and Elings et al. U.S. Pat. No. 5,412,980.

AFMs may be designed to operate in a variety of modes, including contact mode and oscillating mode. In contact mode operation, the microscope typically scans the tip across the surface of the sample while keeping the force of the tip on the surface of the sample generally constant. This effect is accomplished by moving either the sample or the probe assembly vertically to the surface of the sample in response to sensed deflection of the cantilever as the probe is scanned horizontally across the surface. In this way, the data associated with this vertical motion can be stored and then used to construct an image of the sample surface corresponding to the sample characteristic being measured, e.g., surface topography. Alternatively, some AFMs can at least selectively operate in an oscillation mode of operation such as TappingMode™. (TappingMode is a trademark of Veeco Instruments, Inc.) operation. In TappingMode™ operation the tip is oscillated, typically at or near a resonant frequency of the cantilever of the probe. The amplitude or phase of this oscillation is kept constant during scanning using feedback signals, which are generated in response to tip-sample interaction. As in contact mode, these feedback signals are then collected, stored, and used as data to characterize the sample.

Regardless of their mode of operation, AFMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research.

The force interaction between the tip and sample surface depends on the material properties of the tip and the sample. Studies of cantilever dynamics in TappingMode™ have shown that the vibration spectrum of tapping cantilevers exhibit peaks at integer multiples (higher harmonics) of the excitation frequency which, as discussed above, is typically the cantilever's resonant frequency. These harmonics are generated by the nonlinearity of the tip-sample interaction.

It is well know that any periodic signal can be represented by a Fourier series. In the case of a SPM tip interacting with a sample in TappingMode™, the periodic signal can be represented by the Fourier transform:

$$F(t) = \sum_{n=1}^{N} A_n e^{inw(t)}$$

Where:
N=the number of harmonics;
A=the amplitude at each (n) harmonic.

As N becomes higher, the wave generated by the Fourier series approximates a square wave increasingly accurately. As a result, a square wave of force versus time is generated with increased accuracy. Once this time varying force is known during probe-sample interaction, a force curve can be easily generated based on the measured Z motion of the probe or sample and the known cantilever spring constant. Force curves are often used in scanning probe microscopy to obtain information about the sample including its elasticity and adhesiveness. The possibility of generating force curves obtaining sample hardness information using harmonic measurements is described, for example, in U.S. Pat. No. 6,935,167 to Sahin, as well as Stark, Spectroscopy of Higher Harmonics in Dynamic Atomic Force Microscopy, Nanotechnology 14 (2004) pp 347-351. The subject matter of both of these documents is hereby incorporated by reference by way of background. The ability to obtain real-time measurement of tapping force curves using harmonic resonance imaging (HRI) will permit the determination of characteristics of tip-sample interaction, such as elasticity, adhesion, and peak force with nm-scale resolution.

Figure 1A:
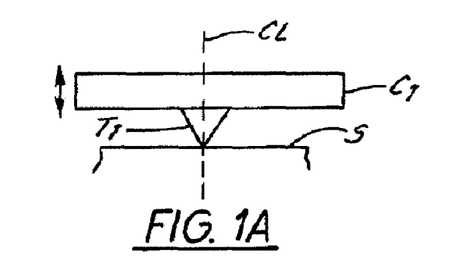
FIGS. 1A and 1B are schematic end views of a traditional AFM probe and a torsional probe, respectively.

It has also been discovered that higher order components, especially the ones around 15th harmonic, depend highly on the tip/sample contact time. Hence, highly approximated square waves and the resultant accurate force curves can best be obtained by accurately measuring higher order harmonics. Unfortunately, the harmonics generated during "traditional" TappingMode imaging are too small for practical AFM imaging. "Traditional" in this regard means that oscillations are measured only about a lateral axis or vertically as represented by the arrows in FIG. 1A. The tip $T_1$ of the traditional probe $P_1$ is typically located on the longitudinal centerline CL of the cantilever $C_1$. The harmonic amplitude response drops off very quickly when imaging in traditional TappingMode. Signals at higher harmonics are 20-30 dB lower than the signal at the driving frequency of the cantilever $C_1$. Thus, the resolution of imaging using the higher harmonics signals is severely limited. In fact, measurement of harmonics beyond the second or third is very difficult.

Figure 1B:
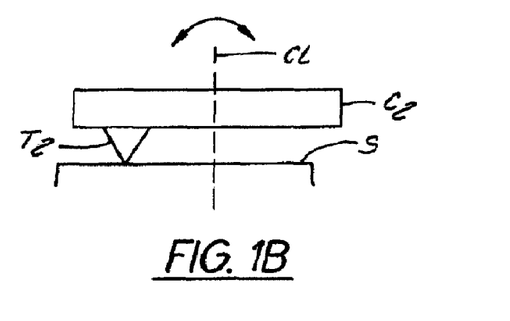
Figure 2A:
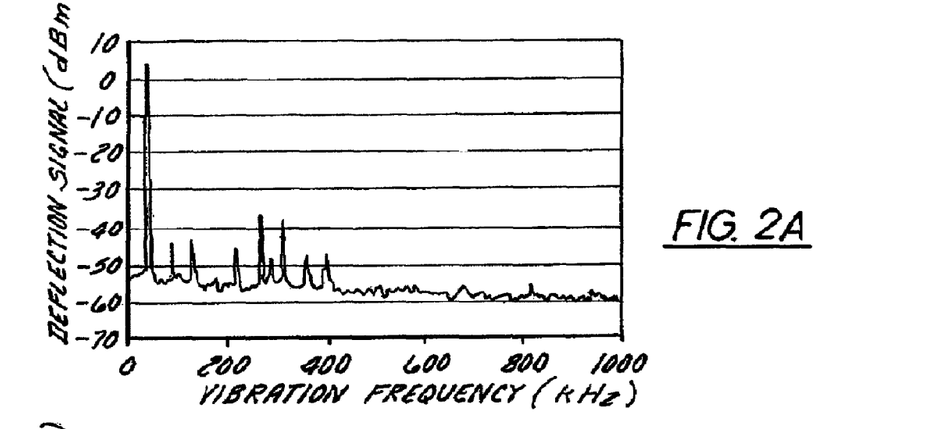
FIGS. 2A and 2B are graphs showing harmonic amplitude amplifications provided by a traditional AFM probe and a torsional probe, respectively.
Figure 2B:
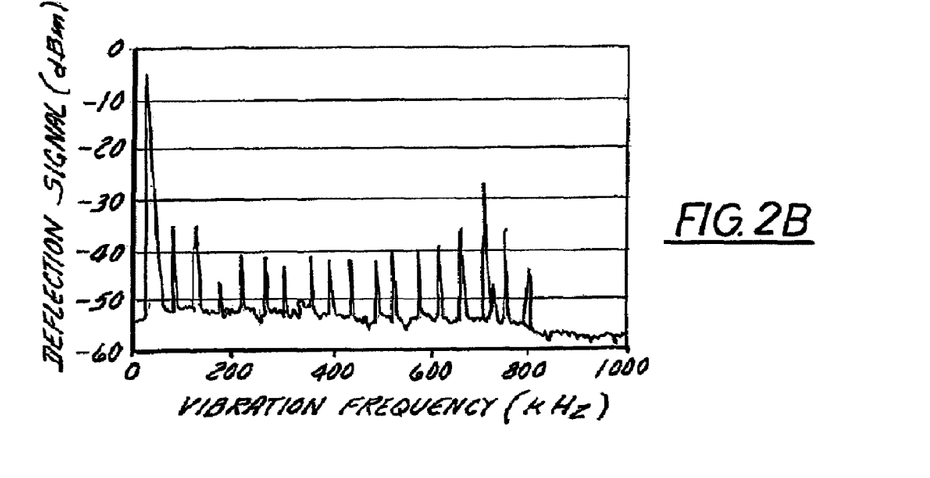

It has been found that imaging in "torsional resonance" mode amplifies high order harmonics. "Torsional" oscillation is characterized by oscillating the cantilever side-to-side or about a longitudinal axis. Driving a traditional probe (i.e., a probe in which the tip is positioned on the longitudinal centerline of the cantilever) in torsional resonance can increase the amplification of the deflection signal by about 8 times. This improvement can be increased to 15-20 times by flexurally oscillating a cantilever designed to increase signal magnification when oscillating in torsional resonance mode. A cantilever $C_2$ found to work well for this purpose is one bearing a tip $T_2$ which is offset laterally from the longitudinal centerline CL of the cantilever $C_2$ as seen in FIG. 1B. The offset tip placement enhances the torsional motion represented by the arrow in FIG. 1B, of the cantilever when the cantilever $C_2$ is oscillated in flexure or about a lateral axis. Specifically, when the offset tip $T_2$ engages the sample surface, the interaction forces excite the torsional modes of the cantilever. In the present description, a probe having a cantilever with an offset tip placement for enhancing torsional motion will be referred to as a "torsional probe." The amplification achieved by imaging using a torsional cantilever oscillating in flexure can be appreciated by comparing FIGS. 2A and 2B, which illustrate spectra of the flexural and torsional vibrations, respectively, of a traditional cantilever and a torsional cantilever tapping on a sample surface at the fundamental flexural resonance frequency. From a comparison of the vibration spectrum of the flexural mode (FIG. 2A) and the vibration spectrum of the torsional mode (FIG. 2B), it can be observed that more high harmonic force components are excited in the torsional mode with better signal to noise ratio. Thus, more information regarding the tip-sample interaction can be retrieved from the torsional vibration spectrum. The use of a torsional cantilever to provide improved harmonic resonance imaging in torsional resonance imaging mode is described, for example, in U.S. Pat. No. 7,089,787, the subject matter of which is incorporated by reference.

It is often desirable to obtain sufficient information about a heterogeneous sample to permit the differentiation of at least one component of the sample from other components. For example, it is often desirable to create a "compositional map" of a sample to ascertain the distribution and/or the volumetric percentage of at least one component in the sample. However, ascertaining the time varying force at a particular location on a sample surface through harmonic resonance imaging only provides information about that location. It does nothing to aid in compositional mapping of a sample surface. Compositional mapping therefore must be performed using "traditional" metrology techniques such as phase imaging with their attendant drawbacks, including a relative narrow range of materials that may be mapped and relatively low resolution imaging.

SUMMARY OF THE INVENTION

In accordance with an aspect of the invention, a method is provided of differentiating at least one component of a heterogeneous sample from other component(s) using harmonic resonance imaging and of obtaining information regarding the sample from the differentiation. In a preferred embodiment, an image is created of a property of a harmonic or a combination of harmonics producing a response having a contrast factor between the sample's constituent components. The desired harmonic(s) can be identified either in a preliminary data acquisition procedure on the sample or, if the sample's constituent materials are known in advance, predetermined. The desired harmonic(s) may be identified directly by the user or automatically through, e.g., pattern recognition. Once the information required for the compositional map is obtained, a compositional map may be generated and displayed and/or additional information about the sample may be obtained. This information may, for example, be particle size distribution, particle size density, and/or aspect ratio of one or both components. It could also comprise the identification of zones of mechanical, electrical, or other influence of one material on another. Compositional imaging at a specific harmonic frequency or combination of frequencies will prove over 10 times better compositional imaging than is obtained by phase imaging over a 100 times broader material range.

In accordance with another aspect of the invention, an AFM capable of operating at least generally as described above is provided.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

In a preferred embodiment of the invention, a scanning probe microscope (SPM) is used to obtain information about a sample through harmonic resonance imaging (HRI). The SPM may comprise any instrument that utilizes a tip-bearing probe to obtain information concerning a sample and that is capable of oscillating the tip. It may, for instance, comprise a scanning tunneling microscope (STM), a scanning magnetic force microscope (MFM), a scanning capacitance microscope (SCM), a scanning near-field optical microscope (NSOM), a scanning thermal microscope (SThM), or an atomic force microscope (AFM). An embodiment of the invention in the form of an AFM will now be disclosed, it being understood that the invention applies to all other SPMs as well.

Figure 3:
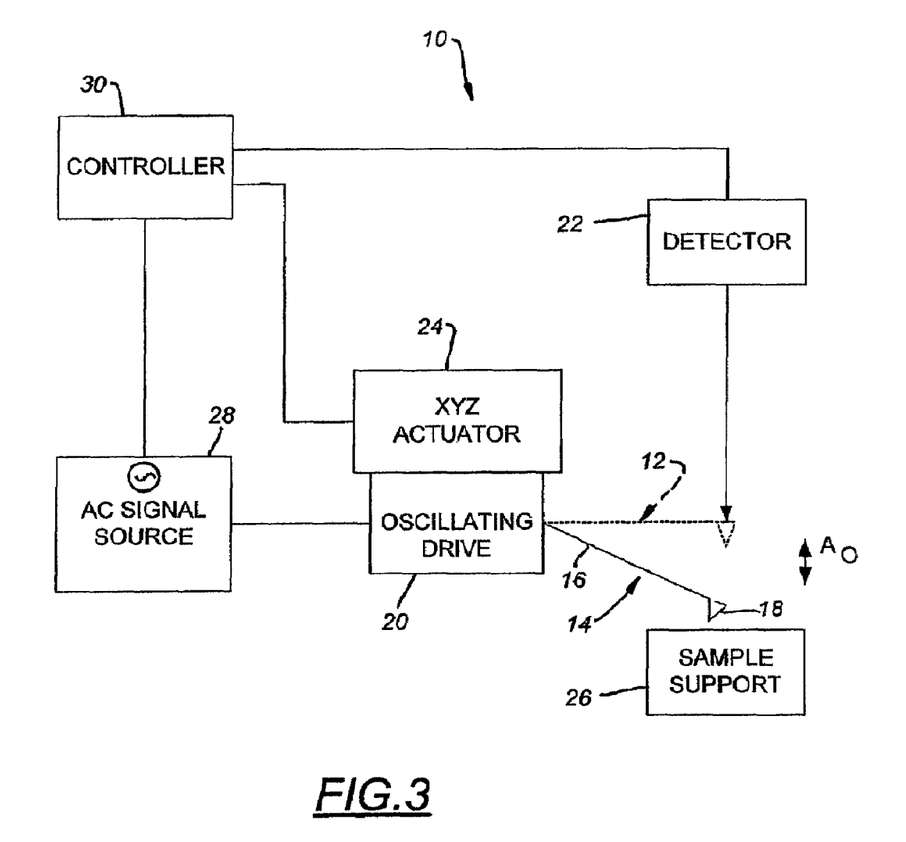
FIG. 3 schematically illustrates an AFM configured to perform harmonic resonance imaging in accordance with a preferred embodiment of the invention.

Referring to FIG. 3, an AFM 10 constructed in accordance with a preferred embodiment of the invention includes a probe device 12 including a base (not shown) and a probe 14. The probe 14 has a cantilever 16 supported by the base and a tip 18 located on the free end of cantilever 16. The cantilever preferably has a known flexural spring constant of about 5 to 30 N/m, most preferably about 8 N/m. It also has flexural resonant frequency of 50 to 100 kHz (65-70 kHz being especially preferred) and a torsional resonant frequency of 10 kHz to 1 MHz with a corresponding harmonic frequency range of 20 kHz to 19 MHz. The cantilever's torsional spring constant should be less than 40 times its flexural spring constant and most preferably about 30 times its flexural spring constant. Its torsional resonant frequency should be more than 12 times its flexural resonant frequency and preferably more than 15 times its flexural resonant frequency.

Still referring to FIG. 3, the probe 14 and/or sample are also driven to move relative to one another via an actuator arrangement 24 coupled to a sample support 26, the probe 14, or both. Hence, though actuator arrangement 24 is shown coupled to the probe 14, it may be employed to move the sample support 26 relative to the probe 14. The actuator arrangement 24 may comprise a single actuator that moves the driven element (the probe or the sample) in one or more directions. In a preferred embodiment, the actuator arrangement includes a first, X-Y actuator that drives the probe or sample to move in an X-Y plane and a second, Z actuator that drives the probe or sample to move in the Z direction. The actuators may, for example, comprise piezoelectric tubes. They could alternatively comprise any other device or devices that generate direct or indirect linear or non-linear movement of the driven element. The actuator arrangement 24 may be connected to the driven device either independently or as an assembly with one actuator, such as the Z actuator, being sandwiched between the other actuator and the driven element, in this case the probe.

An actuator or drive 20, powered by an AC power source 28, drives cantilever 16 to deflect during operation. The drive 20 is an oscillating drive that drives probe 14 at or near the probe's resonant frequency. The oscillating drive 20 may be coupled to a stationary workhead or may be formed integrally with the cantilever 16 of probe 14 as part of a self-actuated cantilever/probe. The drive 20 and/or the probe 14 are also arranged to excite the probe 14 to resonate in torsion or about its longitudinal axis. For instance, the probe 14 could be a standard center-tipped probe and excited in a torsional resonance mode as described, e.g., in U.S. Pat. No. 6,945,099 (the '099 patent) to the assignee of the present invention and the subject matter of which is hereby incorporated by reference. Preferably, however, the probe is a torsional probe having an off-center tip as described in the Background section above and as shown in FIG. 1B and is excited to oscillate in flexure or about a lateral axis. As discussed in the Background section above, measuring torsional motion of a torsional probe oscillating in flexure can permit the detection of the $20^{th}$ and higher harmonics with acceptable signal to noise ratio. As still another possibility, the probe 14 could have an offset tip and be oscillated in torsion as described in the '099 patent.

The actuator(s) of the actuator arrangement 24 and the probe drive 20 are controlled by a controller 30. Controller 30 can comprise a single digital controller such as a CPU, analog circuitry, and/or a hybrid controller having some digital circuitry and some analog circuitry. It can also be formed from a number of integrated or dedicated control devices.

In operation, an electronic signal is applied from AC signal source 32 under control of an AFM controller 30 to drive 20, thus moving probe 14. The probe 14 may be driven to oscillate, preferably at a selected free oscillation amplitude $A_o$. $A_o$ can be varied over a broad range, e.g., from microns to nanometers, the latter being typically used for non-contact force measurements. Probe motion is monitored under feedback using the detector 22.

In accordance with a preferred embodiment of the invention, harmonic resonance properties such as amplitudes are determined and used to obtain compositional information of a heterogeneous sample. Preferably, harmonics or a combination of harmonics are selected that provide a sufficiently high contrast to differentiate the sample's constituent components. Images of the harmonic properties are then tabulated, either directly or after further data manipulation and/or displayed to produce a "compositional map."

This compositional information can be used to create a color coded image of the sample of interest. In this case, the pixels in the image are shaded according to the identified constituents. For example, if there are three components identified in a material that have differentiated harmonic signatures, then each signature can be given a different color code, say red, green, and blue. These colors can be displayed separately, or overlaid on top of a topographic or other AFM image of a sample allowing visual discrimination of where specific components are in a heterogenous sample. In some areas, especially interface regions, the mechanical signature of a particular region will be a blend between the mechanical properties of one material and an adjacent material. In that case a harmonic signature at a particular point may be color coded by overlapping color shades. These overlapping shades are particularly useful for identifying interface regions where the mechanical properties of a material differ from the bulk properties. The changes of mechanical properties in confined geometries, for example, thin films and/or small domain sizes are critical to the performance of many new materials. Additional information about the components, such as particle size distribution and effects, can also be obtained.

Figure 4:
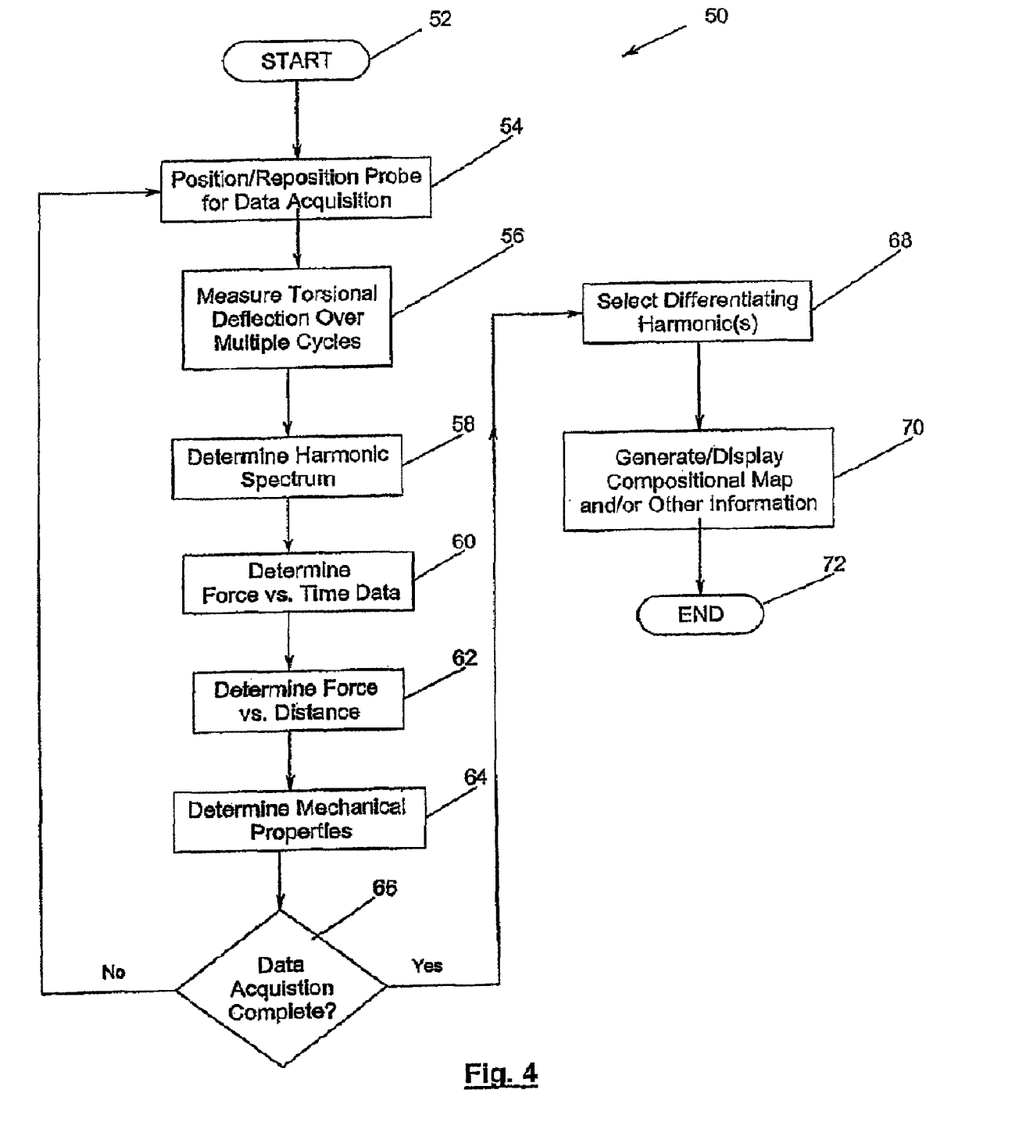
FIG. 4 is a flowchart of a process for performing harmonic resonance imaging and acquiring data from the resultant information in accordance with the present invention.

Referring to FIG. 4, a preferred procedure for measuring harmonic amplitude and using a selected harmonic or a combination of harmonics to generate a compositional map of a sample is illustrated in the form of a flowchart. Procedure 50 proceeds from START in Block 52 to Block 54 where a location on the sample surface is selected for data acquisition. In the typical case in which an image of at least a substantial portion of the sample's surface area is measured, this positioning is performed automatically under control of the controller 30 as part of a scan operation. The most typical scan operation performed by AFMs is a so-called "raster scan" in which the X-Y actuator is controlled automatically by the controller to acquire data along lines in the x direction which are incremented in the y direction.

Figure 5:
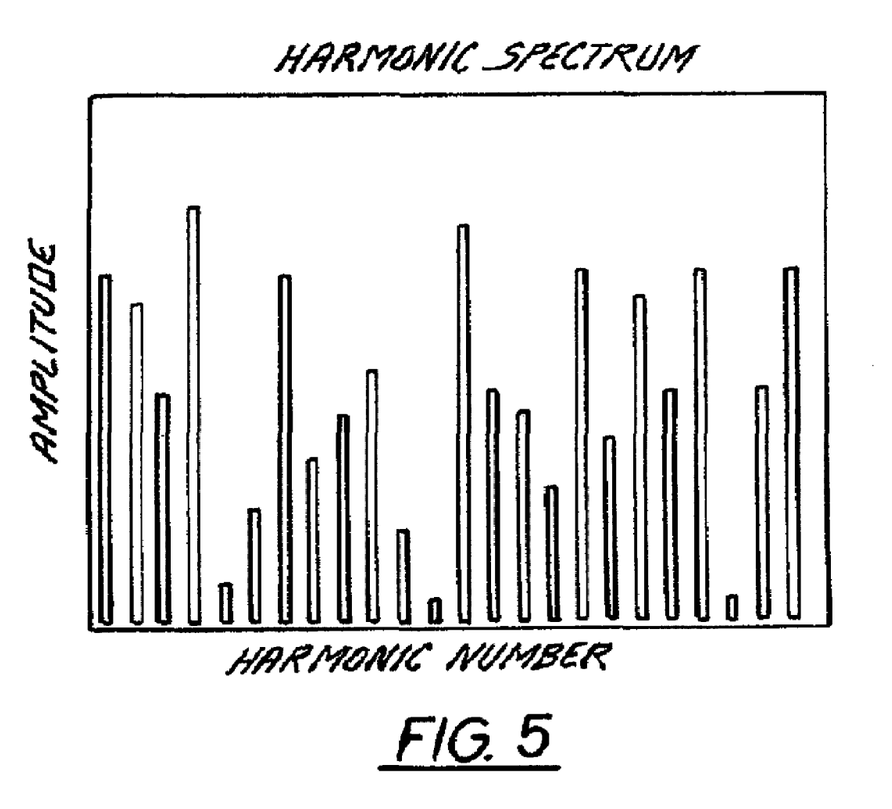
FIG. 5 is a bar graph showing the harmonic spectrum obtained through the harmonic resonance imaging of a sample material.

Next, in Block 56, torsional deflection data is acquired at the selected point while the probe is driven to oscillate in flexure as described above. The data must be acquired over a sufficient number of cycles to generate a Fourier series. This typically will require about 50-100 cycles. Next, in Block 58, the amplitudes of each of a desired number N of harmonics is determined using a Fourier transform function as described above and in the above-referenced U.S. Pat. Nos. 6,935,167 and 7,089,787. The number N should be selected to be as high as possible with acceptable signal to noise ratio. N should be at least 5, more preferably at least 10, and even more preferably at least 20. The resultant harmonic spectrum data is stored and, if desired, displayed in real-time in an image such as the one seen in FIG. 5.

Figure 6:
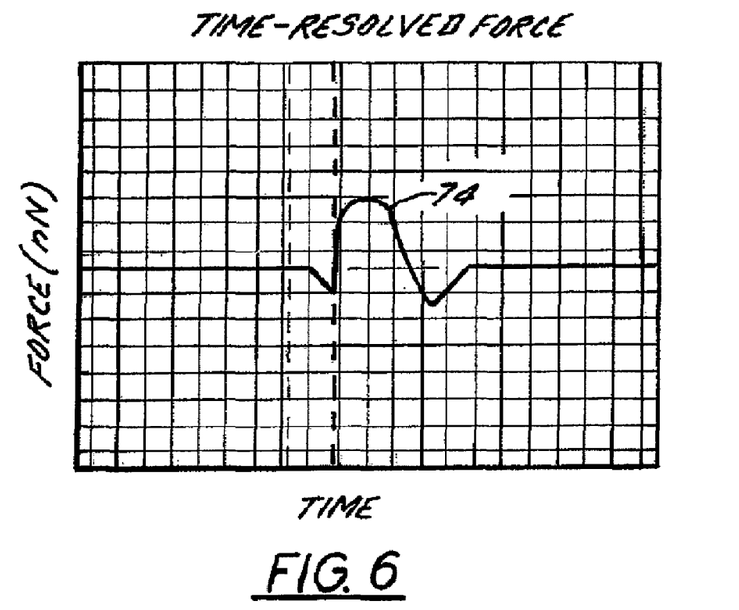
FIG. 6 is a graph of the force versus time curve generated from the harmonic spectrum of FIG. 5.
Figure 7:
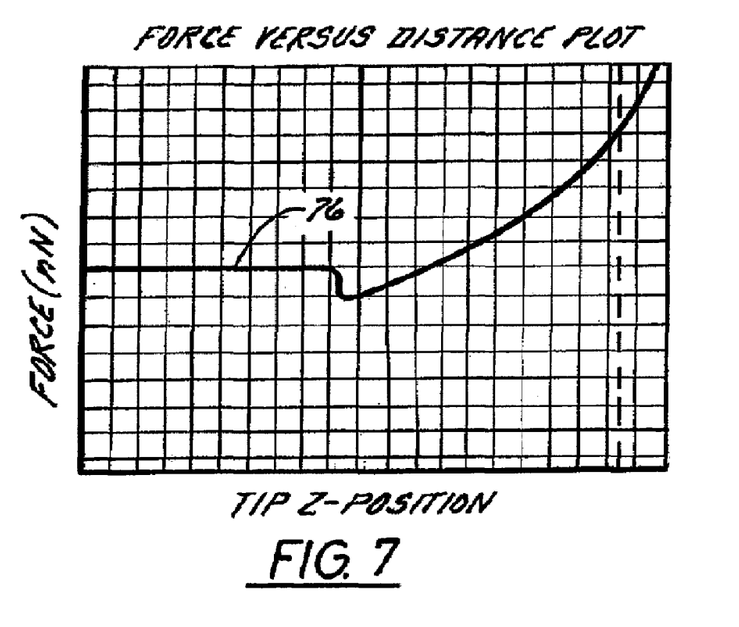
FIG. 7 is a graph of force versus deflection curve generated from the harmonic spectrum of FIG. 5.

No additional manipulation of the harmonic amplitude or other harmonic property data is required for compositional mapping. However, because, as described above, harmonic amplitude data can be converted to force/distance data, it may also be desirable to obtain force dependent information concerning the selected point on the sample at this time. Hence, in the preferred embodiment, the Process 50 proceeds to optional Block 60, where the harmonics amplitude data is converted to force versus time data using the known spring constant of the AFM cantilever. The resulting force versus time curve is illustrated at 74 in FIG. 6. Distance verses time can also be determined at this time by measuring cantilever deflection. From these two plots, it is a simple matter to determine force versus distance data as shown in Block 62. The resultant force curve is shown at 76 in FIG. 7. As is known in the art, valuable material properties and information concerning probe/sample interaction can be obtained directly from the force curve. These properties include elasticity, adhesion, and peak force. They are determined in a conventional manner in Block 64. These properties can be determined with extremely high resolution on the single nm scale. Elasticity can be measured over an extremely wide range of about 10 MPa to 100 GPa. Adhesion also can be measured over an extremely wide range of about 10 pN to 1 µN. Both of these measurements can be made with high repeatability.

This ability to measure tapping force curves and resultant material-dependent information in real time provides a valuable tool to understand the mechanics of the interface between the probe and a sample. Determining and displaying peak force in real time can also be used as feedback to reduce tip wear and even prevent tip damage when imaging a hard surface. It can also be used as feedback to limit peak tapping forces on soft biological samples to levels that prevent damaging the samples.

Referring again to FIG. 4, after determining mechanical properties of the sample in Block 64, the process 50 next proceeds to Block 66, where an inquiry is made as to whether data acquisition is complete. If not, the Process 50 returns to Block 54, and the X-Y actuator of the actuator arrangement 24 is energized to index the probe 14 to the next location. The procedures of Blocks 54-64 are then repeated on a point by point basis until the scan is complete.

Figure 8A:
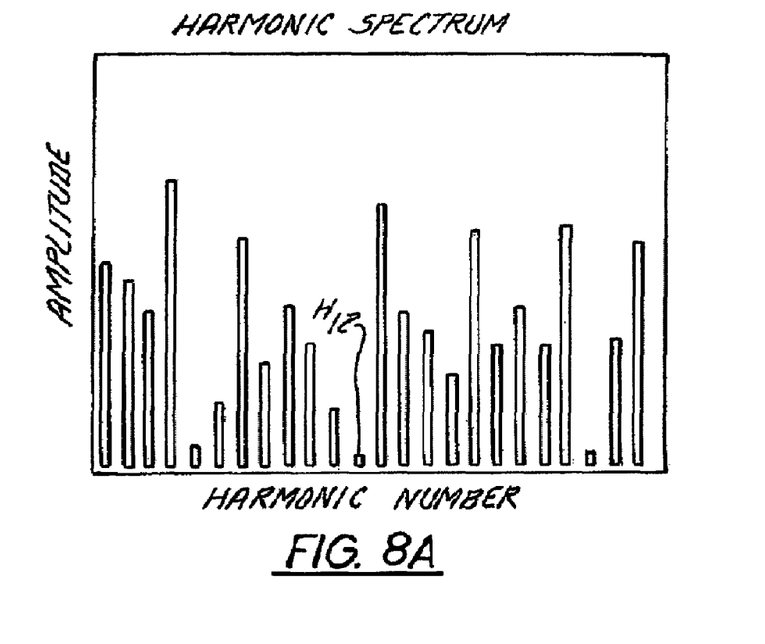
FIGS. 8A and 8B are bar graphs of harmonic spectra obtained through the harmonic resonance imaging of two different points of a heterogeneous sample containing two different materials.
Figure 8B:
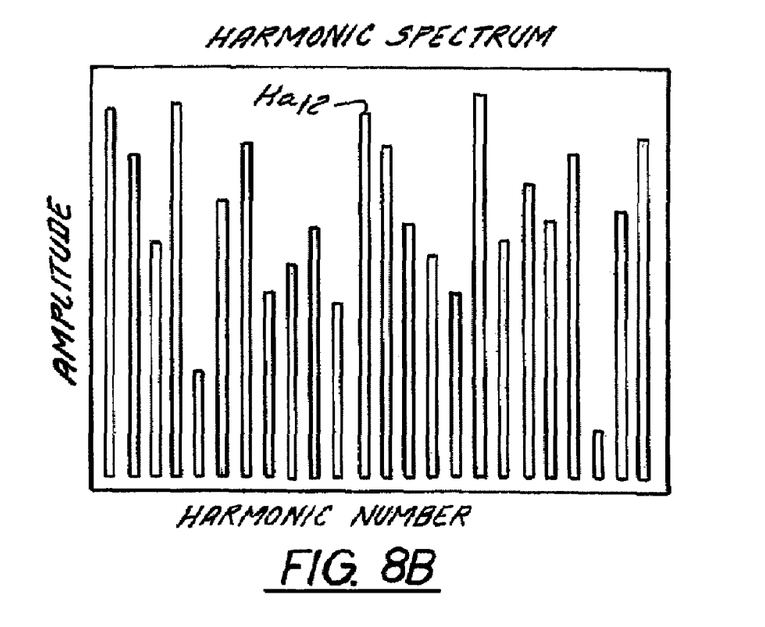

The harmonic spectrum obtained through HRI imaging varies with material properties. Hence, comparing FIGS. 8A to 8B, which both plot harmonic amplitude for the first through $20^{th}$ harmonic amplitude for components A and B of a heterogeneous material. In this example, the amplitude of the $12^{th}$ harmonic varies dramatically between components A and B, being very low for component A and very high for component B. In accordance with a preferred aspect of the invention, a harmonic amplitude or a combination of harmonic amplitudes is selected for imaging that permits differentiation of the sample's constituent components. The harmonic or combinations of harmonics that is/are selected should have high differentiation for all of the constituent components of the material. (It should be noted at this time that, while most of the examples provided herein discuss two-component materials, the techniques discussed herein apply equally to materials having three or more components). The response of a harmonic or combination of harmonics having the greatest differentiation is/are preferred in order to maximize contrast.

Hence, while the differentiating harmonic selection procedure is shown in FIG. 4 as a Step 68 occurring after the end of a scan operation, it could be performed prior to or simultaneously with the scan operation.

The harmonic responses of interest typically include for example the amplitude and/or phase of the cantilever's motion at a harmonic frequency. The amplitude and/or phase can be measured with a lock-in amplifier, an RMS-to-DC converter, a phase detector or any suitable demodulation circuit. It is also possible to sample the cantilever waveform digitally, and then calculate the individual harmonic responses using a digital lock-in amplifier, a peak detection algorithm or a mathematical procedure like a Fourier transform. Other responses, such as the in-phase and quadrature components may also be used instead of or in addition to, the harmonic amplitude and phase. Other signals that are similarly representative of the cantilever's motion at a particular harmonic frequency may also be used.

The selection of optimal harmonics may be performed manually or may be performed automatically through calculations. For manual selection of optimal harmonics it is useful to display the relative or absolute responses of individual harmonics in a spectral display such as those shown in the graphs of FIGS. 8A and 8B. Visual images of the harmonic amplitudes could also be differentiated by the controller 30 via any of a number of pattern recognition techniques. A particularly preferred technique is principal component analysis (PCA). With PCA, features are considered to be principal components of a data set. The principal components are random variables of maximal variance constructed from linear combinations of the input features. They can also be thought of as the projections onto the principal component axes, which are lines that minimize the average squared distance to each point in the data set. To ensure uniqueness, all of the principal component axes must be orthogonal. PCA is a maximum-likelihood estimator for linear regression in the presence of Gaussian noise on both x and y. In some cases, PCA is analogous to a Fourier transform, such as the Digital Cosine Transform used in JPEG image compression. PCA is well known and described in detail, for instance, in Principal Component Analysis, I. T. Jollife, Springer-Verlag, 1986 and in Chemometrics: A Practical Guide, K. R. Beebe, R. J. Pell, M. B. Seasholtz, John Wiley & Sons, 1998. An additional approach would be to use artificial neural networks (ANN) as described in Neural Networks for Pattern Recognition, Christopher M. Bishop, Oxford University Press, 1995. ANNs are increasingly being used in pattern recognition applications. ANNs are described, for example, in the above-noted publication. As known in the field, they can be robust classifiers with the ability to generalize when making decisions about imprecise input data. Often, however, PCA is the preferred technique over ANN as PCA is generally "unsupervised" pattern recognition, contrary to ANN which typically requires training to work properly.

It should also be noted at this time that the harmonic or harmonic combination desired for imaging can be selected prior to a scan operation based upon measurement of components A and B in other sample(s) (assuming those components are known and not sample-specific) or on a prior measurement of the sample being scanned. If a harmonic or harmonic combination is selected based on a prior measurement of the sample being scanned, the measurements required to determine the spectrum are preferably performed using a so-called "point and shoot" measurement technique rather than a full sample scan. In the point and shoot technique, the probe is simply positioned over two locations known to contain components A and B, respectively, and harmonic spectra are generated at those locations.

Figure 9:
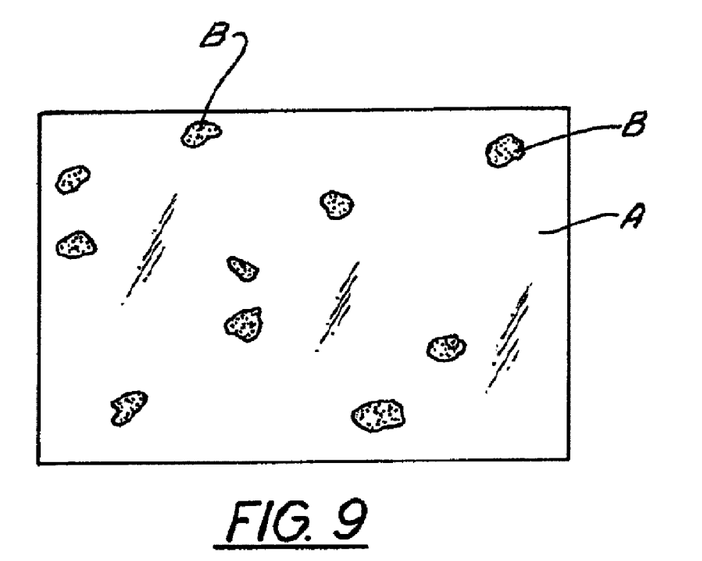
FIG. 9 schematically represents a compositional map obtainable through the harmonic resonance image of a first heterogeneous sample in accordance with the invention.

Returning again to the flowchart of FIG. 4, after scanning is complete, a full image of the amplitudes or other properties of the selected harmonic(s) is generated and displayed in Block 70 to form a compositional map, and the Process 50 proceeds to END in Block 72. The resultant compositional map is illustrated in FIG. 9 in which the light areas show component A of low harmonic amplitude and the dark areas show component B of high harmonic amplitude. These compositional maps can be created with substantially higher resolution and over a much wider range of sample stiffnesses than with phase imaging. Compositional maps of samples having a stiffness of about 10 MPa to 100 GPa can be generated. In contrast, conventional phase imaging can become less successful when attempting to map materials having stiffnesses above a few GPa. These measurements can be made with a spatial resolution of about 20 nm.

To the extent it might not be evident from the above discussion, it is worth noting at this point that HRI based compositional mapping provides dramatically better contrast than compositional mapping through phase imaging (a factor of about 10×) and has about a 100 times broader material range.

Mapping is not limited to compositional mapping. As discussed above, adhesion and elasticity are determined at each data point, and adhesion and/or elasticity maps can also be generated and displayed. These maps have independent value in many applications and, in some applications, may have greater value to the user than compositional maps.

Other information regarding the sample can be determined after acquiring the data required to generate a compositional map. For instance, mean particle size, particle size distribution, and aspect ratio can be easily determined through calculation and statistical analyses. Mean particle size is determined simply by measuring the area of each imaged "B" particles and determining the average area. Aspect ratio can be determined simply by determining the ratio of the area (and hence the volume) of particles "B" in the surface of material "A". Particle distribution is determined statistically by determining the deviation of the measured particle B diameters from the mean diameter. A general description of the types of particle diameters that can be measured and mean diameters that may be calculated is given in Chapter 2 of Particle Size Measurement: Volume 1, 5$^{th}$ edition, Terrence Allen, Chapman & Hall, 1997. Knowing particle distribution is highly desirable in applications in which the material property is critically dependent on a certain material particle size, requiring the particle distribution to be very small. Harmonic resonance imaging can therefore be used to determine if a sample's particle distribution is within tolerance.

Compositional mapping under different conditions can provide additional information regarding a sample. For instance, repeated mapping during heating of a sample, and observations in changes in the image reflecting a drop in hardness, would permit a determination of the glass transition temperature of each sample component.

Figure 10:
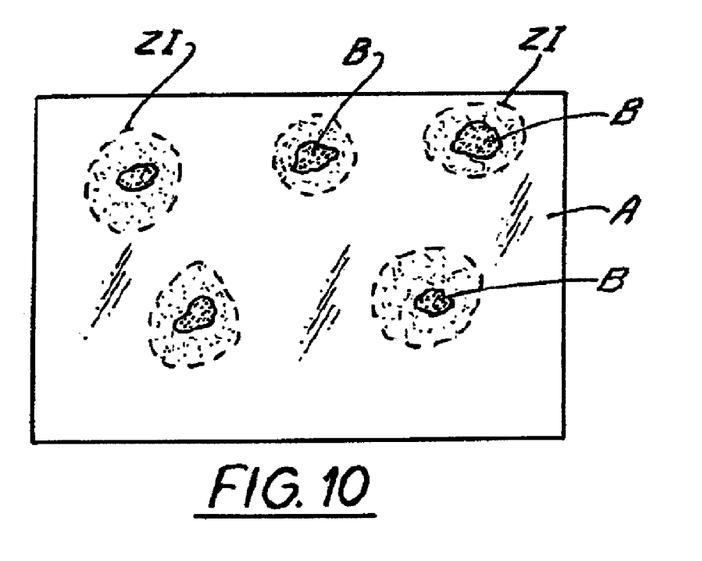
FIG. 10 schematically represents a compositional map obtainable through the harmonic resonance image of a second heterogeneous sample in accordance with the invention.

The data obtained for HRI-based compositional mapping can also be used to obtain information regarding zones of influence of one component or another. For instance, in a sample formed primarily of a soft material with small particles with relatively hard materials imbedded in its surface, the soft material areas immediately surrounding each hard particle will be influenced by that particle, typically by exhibiting a hardness that is intermediate between the two materials. Electrical and other properties of embedded particles may also affect properties in a surrounding region of the base material. This region is typically known as an "interface region." When imaging this interface region in HRI, the selected harmonic amplitude will have an amplitude that is intermediate those indicative of the two components A and B, resulting in an image darkness in a region that is intermediate that of the two components as illustrated by the area within the phantom lines ZI in FIG. 10. The acquired information, particularly the force curve information, can be used to obtain qualitative and even quantitative information about the interface regions, including hardness, elasticity, and adhesiveness. It can also be used to obtain information regarding the ability of the sample to dissipate energy.

In summary, HRI imaging can provide point-based and map-based material property information rapidly, with high resolution, and over a wide variety of material properties.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. The scope of still other changes to the described embodiments that fall within the present invention but that are not specifically discussed above will become apparent from the appended claims and other attachments.

We claim:

1. A method comprising:
   a. providing a scanning probe microscope (SPM), the SPM including a probe having a cantilever bearing a tip;
   b. oscillating the cantilever of the probe such that the probe intermittently interacts with a heterogeneous sample;
   c. measuring torsional motion of the cantilever resulting from the interaction;
   d. differentiating materials of the sample based on harmonics of the measured torsional motion; and
   wherein the differentiating step comprises comparing the measured torsional motion at two or more harmonics to identify at least one harmonic that has a response that provides contrast among the materials, and wherein at each harmonic the harmonic components of the torsional motion are used to reconstruct the interaction between the probe and the sample at that harmonic.

2. The method of claim 1, wherein the differentiating step comprises identifying one or more harmonics that produces a response having the greatest contrast between the materials.

3. The method of claim 1, wherein the identifying step utilizes at least one of manual inspection of harmonic data, and pattern recognition.

4. The method of claim 3, wherein the identifying step utilizes at least one of full or partial spectral principal component analysis and artificial neural networks.

5. The method of claim 1, wherein the differentiating step includes constructing a combination of harmonics that produce responses having a contrast among the materials.

6. The method of claim 1 further comprising the step of color coding an SPM image of the sample as a result of the differentiating step.

7. The method of claim 6, further comprising the step of identifying mechanical interfaces from the color coding step.

8. The method of claim 1, further comprising, based on the measurement, mapping a property of the sample over an area of the sample surface.

9. The method of claim 1, further comprising, based on the measurement, obtaining component area fraction information of at least one component of the sample.

10. The method of claim 9, wherein the interface region information comprises at least one of elasticity information, information concerning adhesiveness, and information concerning the ability of the sample to dissipate energy.

11. The method of claim 1, further comprising, based on the measurement, obtaining particle size information of at least one component of the sample.

12. The method of claim 11, wherein the particle size information comprises at least one of particle size distribution, particle volume, and particle aspect ratio.

13. The method of claim 1, further comprising obtaining interface region information about the sample.

14. A method of mapping material properties of a heterogeneous sample, comprising:
   a. providing a scanning probe microscope (SPM), the SPM including a torsional probe having a cantilever bearing a tip, the tip being offset from a longitudinal centerline of the cantilever;
   b. oscillating the cantilever of the probe in flexure while the probe interacts with a sample;
   c. measuring torsional deflection of the cantilever during the interaction;
   d. differentiating materials of the sample based on a selected harmonic or combination of harmonics of the measured torsional motion, and wherein at each harmonic the harmonic components of the torsional motion are used to reconstruct the interaction between the probe and the sample at that harmonic; and
   e. mapping a property of the sample over an area of the sample surface.

15. The method of claim 14, wherein the differentiating step utilizes at least one of data correlation, manual inspection of harmonic data, and pattern recognition.

16. The method of claim 14, wherein the differentiating step utilizes at least one of full or partial spectral principal component analysis and artificial neural network.

17. The method of claim 14, further comprising, based on the measured torsional motion, obtaining component area fraction information of at least one component of the sample.

18. The method of claim 14, further comprising, based on the measured torsional motion, obtaining particle size information of at least one component of the sample.

19. The method of claim 14, wherein the particle size information comprises at least one of particle size distribution, particle volume, and particle aspect ratio.

20. The method of claim 14, further comprising obtaining interface region information about the sample, wherein the interface region information comprises at least one of elasticity information, information concerning adhesiveness, and information concerning the ability of the sample to dissipate energy.

21. A scanning probe microscope (SPM) comprising:
   a. a probe having a cantilever bearing a tip;
   b. a drive that drives the probe to oscillate;
   c. a detector that measures motion of the probe; and
   d. a controller that interacts with the drive and the detector, the controller being operable to
      i. cause the drive to oscillate the cantilever of the probe while the probe interacts with a heterogeneous sample,
      ii. using data from the detector, measure torsional deflection of the cantilever during the interaction, and
      iii. differentiate materials of the sample based on harmonics of the measured torsional motion, and wherein at each harmonic the harmonic components of the torsional motion are used to reconstruct the interaction between the probe and the sample at that harmonic; and
   wherein the controller differentiates materials using harmonics identified as producing responses having a contrast among the materials.

22. The SPM of claim 21, wherein the controller is further operable, based on the measurement, to map a property of the sample over an area of the sample surface.

23. The SPM of claim 21, wherein the controller is further operable, based on the measurement, to obtain component area fraction information of at least one component of the sample based.

24. The SPM of claim 21, wherein the controller is further operable, based on the measurement, to obtain particle size information of at least one component of the sample.

25. The SPM of claim 21, wherein the controller is further operable, based on the measurement, to obtain interface region information about the sample.

26. A method comprising:
   a. providing a scanning probe microscope (SPM), the SPM including a probe having a cantilever bearing a tip;
   b. oscillating the cantilever of the probe such that the probe intermittently interacts with a heterogeneous sample;
   c. measuring torsional motion of the cantilever resulting from the interaction;
   d. differentiating materials of the sample based on harmonics of the measured torsional motion; and
   e. mapping, based on the measurement, a property of the sample over an area of the sample surface; and
   wherein the differentiating step comprises comparing the measured torsional motion at two or more harmonics to identify at least one harmonic that has a response that provides contrast among the materials.

27. A method comprising:
   a. providing a scanning probe microscope (SPM), the SPM including a probe having a cantilever bearing a tip;
   b. oscillating the cantilever of the probe such that the probe interacts with a heterogeneous sample;
   c. measuring torsional motion of the cantilever resulting from the interaction;
   d. differentiating materials of the sample based on harmonics of the measured torsional motion;
   e. obtaining, based on the measurement, component area fraction information of at least one component of the sample; and
   wherein the differentiating step comprises comparing the measured torsional motion at two or more harmonics to identify at least one harmonic that has a response that provides contrast among the materials.

28. A method comprising:
   a. providing a scanning probe microscope (SPM), the SPM including a probe having a cantilever bearing a tip;
   b. oscillating the cantilever of the probe such that the probe interacts with a heterogeneous sample;
   c. measuring torsional motion of the cantilever resulting from the interaction;

d. differentiating materials of the sample based on harmonics of the measured torsional motion;

e. obtaining, based on the measurement, particle size information of at least one component of the sample; and wherein the differentiating step comprises comparing the measured torsional motion at two or more harmonics to identify at least one harmonic that has a response that provides contrast among the materials.

29. A method comprising:

a. providing a scanning probe microscope (SPM), the SPM including a probe having a cantilever bearing a tip;

b. oscillating the cantilever of the probe such that the probe interacts with a heterogeneous sample;

c. measuring torsional motion of the cantilever resulting from the interaction;

d. differentiating materials of the sample based on harmonics of the measured torsional motion, wherein the differentiating step comprises comparing the measured torsional motion at two or more harmonics to identify at least one harmonic that has a response that provides contrast among the materials, and wherein at each harmonic the harmonic components of the torsional motion are used to reconstruct the interaction between the probe and the sample at that harmonic; and e. obtaining interface region information about the sample.

* * * * *